United States Patent
Scott

(10) Patent No.: US 7,864,381 B2
(45) Date of Patent: Jan. 4, 2011

(54) DOCUMENT ILLUMINATOR WITH LED-DRIVEN PHOSPHOR

(75) Inventor: Thomas R. Scott, Beaverton, OR (US)

(73) Assignee: Xerox Corporation, Norwalk, CT (US)

( * ) Notice: Subject to any disclaimer, the term of this patent is extended or adjusted under 35 U.S.C. 154(b) by 959 days.

(21) Appl. No.: 11/725,860

(22) Filed: Mar. 20, 2007

(65) Prior Publication Data

US 2008/0231911 A1 Sep. 25, 2008

(51) Int. Cl.
H04N 1/04 (2006.01)

(52) U.S. Cl. .................. 358/474; 358/487; 358/509; 358/475

(58) Field of Classification Search .......... 358/474, 358/486, 497, 496, 487
See application file for complete search history.

(56) References Cited

U.S. PATENT DOCUMENTS

| | | | |
|---|---|---|---|
| 5,813,753 A | 9/1998 | Vriens et al. | |
| 6,236,470 B1* | 5/2001 | Seachman .................. 358/471 |
| 6,252,254 B1 | 6/2001 | Soules et al. | |
| 6,294,800 B1 | 9/2001 | Duggal et al. | |
| 6,316,266 B1* | 11/2001 | Nelson ......................... 436/86 |
| 6,469,808 B1* | 10/2002 | Onishi et al. ................ 358/475 |
| 6,621,211 B1 | 9/2003 | Srivastava et al. | |
| 6,635,987 B1 | 10/2003 | Wojnarowski et al. | |
| 6,661,497 B2 | 12/2003 | Tabata et al. | |
| 6,685,852 B2 | 2/2004 | Setlur et al. | |
| 6,710,899 B2* | 3/2004 | Chung et al. ................ 358/475 |
| 6,809,471 B2 | 10/2004 | Setlur et al. | |
| 6,853,131 B2 | 2/2005 | Srivastava et al. | |
| 6,936,857 B2 | 8/2005 | Doxsee et al. | |
| 7,038,370 B2 | 5/2006 | Mueller-Mach et al. | |
| 7,075,225 B2 | 7/2006 | Baroky et al. | |
| 7,112,921 B2 | 9/2006 | Menkara et al. | |
| 7,157,745 B2 | 1/2007 | Blonder et al. | |
| 7,157,746 B2 | 1/2007 | Ota et al. | |
| 7,158,272 B2 | 1/2007 | Hiromatsu | |
| 7,746,520 B2* | 6/2010 | Herloski et al. ............. 358/475 |
| 7,755,811 B2* | 7/2010 | Herloski et al. ............. 358/475 |
| 2001/0019487 A1 | 9/2001 | Honguh et al. | |
| 2004/0057082 A1* | 3/2004 | Liu ............................. 358/406 |
| 2004/0184113 A1* | 9/2004 | Ide .............................. 358/474 |

(Continued)

FOREIGN PATENT DOCUMENTS

JP 08 007614 1/1996

(Continued)

OTHER PUBLICATIONS

Canon, *Canon Contact Type Image Sensor*, Product No. CLD-12216J-001, Sep. 10, 2004.

(Continued)

*Primary Examiner*—Negussie Worku
(74) *Attorney, Agent, or Firm*—Fay Sharpe LLP

(57) ABSTRACT

A scanning apparatus includes an illuminator for illuminating a portion of a document to be scanned. The illuminator includes at least one light source and an optical element positioned to redirect light emitted by the light source. A phosphor material is disposed to intercept at least a portion of the light redirected by the optical element. A photosensitive device is positioned to receive light reflected from the document for recording an image of the document.

23 Claims, 5 Drawing Sheets

U.S. PATENT DOCUMENTS

| | | | |
|---|---|---|---|
| 2005/0093813 A1* | 5/2005 | Yamamoto et al. | 345/102 |
| 2006/0113553 A1 | 6/2006 | Srivastava et al. | |
| 2006/0159393 A1* | 7/2006 | Ikeda | 385/31 |
| 2006/0227388 A1* | 10/2006 | Proctor | 358/474 |
| 2006/0231849 A1 | 10/2006 | Kang et al. | |
| 2009/0180159 A1* | 7/2009 | Herloski | 358/474 |

FOREIGN PATENT DOCUMENTS

| | | |
|---|---|---|
| JP | 10 097200 | 4/1998 |
| JP | 2006067197 | 3/2006 |

OTHER PUBLICATIONS

Peripheral Imaging Corporation, *Product Spec.*, Model PI1200MC-A4FC, Nov. 22, 2004.

http://www.cyberscholar.com/canon/documents/LIDETech%20Flyer.pdf.

http://64.233.179.104/translate_c?hl=en&ie=UTF-8&oe=UTF-8&langpair=ja%7Cen&u=http://www.canon-compo.co.jp/cci%2520w/cciw421.htm&prev=/language_tools+w/topframe.htm.

http://www.amis.com/products/image_sensors/terminology.html.

http://www.amis.com/products/image_sensors/cis_modules/index.html.

http://www.rohm.com/products/shortform/14sensor/sensor_index.html.

\* cited by examiner

DOCUMENT ILLUMINATOR WITH LED-DRIVEN PHOSPHOR

BACKGROUND

The present disclosure relates to an illuminating apparatus used to illuminate hard-copy documents for digital recording, such as in digital scanners, facsimile machines, and digital copiers. In particular, it relates to an illuminator which includes a phosphor material interposed between a light source and the hard-copy document, which provides a more even illumination.

In office equipment, such as digital copiers and facsimile machines, original hard-copy documents are recorded as digital data using what can be generally called a "scanner." In a typical scanner, a document sheet is illuminated and the light reflected from the document sheet is recorded by a photosensitive device such as a CCD (charge coupled device) or CMOS (complementary metal oxide semiconductor) array (also known as a contact image sensor (CIS)), to be converted to digital image data. Successive narrow strips of the document sheet are illuminated as the sheet is moved through a document handler, or the photosensitive device is moved relative to a platen on which the document sheet is placed. These narrow strips of document image are then assembled by software into a complete image representation of the original document.

CIS scan bars used for document scanning have used a variety of illumination sources, including light emitting diodes (LEDs) and cold cathode fluorescent lamps (CCFL). CCFL illumination can be used directly for monochrome scanning, or by using sensors with an array of RGB (Red, Green, and Blue) color filters over the pixels, CCFL white illumination can be used to scan color images. While CCFL illumination tends to be very uniform and provides white light, such lamps generally employ high voltages and have a high power consumption. LED-based illuminators typically employ a light-transmissive element that exploits internal reflections to direct light from LEDs to emerge in substantially parallel rays from an exit surface of the element toward a document. Scan bars of this type often use a single LED for monochrome scans or a red, blue, and green triplet of LEDs (e.g., based on InGaAlP, InGaN, and GaP) to capture color images. For color scans, the RGB LEDs are turned on one at a time in succession, in order to capture three separate images, one illuminated with each color, from which a full color scan image is then assembled. The illuminator includes a prism for spreading the illumination from each of the three LEDs (RGB) across a strip of the document as uniformly as possible.

Designing an illuminator for a scanner presents challenges in providing, among other aspects, an even illumination along the narrow strip of the document, i.e., in the fast scan direction. Some of these LED-based illuminators use a lenticular, notched rear surface, on the side of the illuminator prism furthest from the document target, which catches the light rays traveling down the length of the illuminator and reflects these rays in a direction which is approximately perpendicular to the longest axis of the scan bar. The reflected rays then exit the illuminator prism from a front surface and illuminate the target document surface. Other scan bars use a white paint pattern on the rear surface, which modifies the index of refraction, as compared to an optical surface exposed to air, to accomplish a similar effect. The notches or paint patterns have a pattern which varies down the length of the light pipe prism in an effort to balance the illumination at the near-end of the prism (closest to the LEDs), where the illumination would otherwise tend to be brightest, with the illumination at the far-end of the prism (farthest from the LEDs). For example, in the notched designs, the notches are deeper and larger at the far-end and shallower at the near-end. In this design, the smaller notches at the near-end where the illumination would be brightest redirect less of the total illumination in the direction of the document, and the larger notches at the far-end are intended to catch more of the total illumination to compensate for being farther from the LED source. However, such LED illuminator light-pipe prisms still exhibit significant illumination non-uniformity. Specifically, they tend not to provide uniform illumination down the length of the scan bar, or when comparing one color to another. Secondary reflections from the far-end of the prism and other scattered light rays tend to make precisely uniform illumination difficult to achieve. Additionally, this design tends to be non-uniform between the specular reflective, and diffuse illumination domains. This last type of non-uniformity is particularly problematic because any correction applied to reduce non-uniformity in one domain tends to result in an increase in non-uniformity in the other. It is generally not possible to calibrate differently for the two domains at one time, and some document surfaces are a combination of specular and diffuse illumination surfaces (e.g., a shiny pebble-grained surface where portions of the shiny surface reflect in the specular domain with the rest being illuminated in the diffuse domain.

Irregularities in the illumination level in the illuminated area can result in defects in the image data, which may not be completely correctable in software, particularly in the case of discrete light sources, such as LEDs.

INCORPORATION BY REFERENCE

The following reference, the disclosure of which is incorporated in its entirety by reference, is mentioned:

U.S. Pat. No. 6,236,470 for REFLECTOR AND LIGHT SOURCE REGISTRATION DEVICE FOR A DOCUMENT ILLUMINATOR by Seachman provides an overview of the art of designing illumination devices for scanners.

BRIEF DESCRIPTION

In accordance with one aspect of the exemplary embodiment, a scanning apparatus includes an illuminator for illuminating a portion of a document to be scanned. The illuminator includes at least one light source, an optical element positioned to redirect light emitted by the light source, and a phosphor material disposed to intercept at least a portion of the light redirected by the optical element. A photosensitive device is positioned to receive light reflected from the document for recording an image of the document.

In accordance with another aspect, an illuminator includes an optical element which defines an entry face and opposed rear and exit faces. The exit face is substantially perpendicular to the entry face. The rear face includes a plurality of reflective elements for redirecting light received from the entry face toward the front face. A particulate material is disposed between the reflecting elements and the front face for diffusing light incident thereon. At least one light source is positioned adjacent the entry face.

In accordance with another aspect, a method for scanning a document includes actuating a light source to emit light, transmitting the light through an optical element which illuminates the document, the transmitting including transmitting the light through a layer of the optical element, the layer comprising a particulate material, whereby the illumination of the document is more uniform than without the particulate material.

DETAILED DESCRIPTION

Aspects of the exemplary embodiment relate to an illuminator and to a document scanning apparatus or "scanner" which incorporates the illuminator. The exemplary embodiment also relates to a method of scanning physical documents for generating scanned images. The documents to be scanned may comprise sheets of paper or other flexible substrate, on which an image or images to be scanned is disposed. The scanner may form a part of an imaging device, such as such as a stand-alone scanner, a copier, a facsimile machine, or a multifunction device, in which a scanned image is rendered on paper and/or stored in digital form, for example, for display, processing, or transmission in digital form. The exemplary scanning device finds application in document scanners, multi-function printers, currency scanners, ID badge scanners, and the like.

Light emitted from an illuminator generally includes diffuse and specular components. The specular component is generally reflected from the hard copy document at the same angle as the light striking the document when the surface is relatively uniform. In some circumstances, a portion of the light from the illumination source may specularly reflect into the imaging sensor and add to its signal output. In conventional scanners, the amount of specularly reflected light reaching the sensor may vary, relative to the amount of diffuse illumination, in the fast scan direction.

In aspects of the exemplary embodiment, a phosphor material is incorporated into an illuminator. The phosphor material diffuses the light emitted by a light source, such as one or more light emitting diodes or laser diodes (both of which will be referred to herein as LEDs). The exemplary illuminator may thus have a more uniform illumination in the fast scan direction, resulting in improvements in image quality. In particular, the amount of specularly reflected light as a proportion of the total light reaching the imaging sensor is decreased and the amount of diffuse light reaching the sensor is increased.

Figure 1:
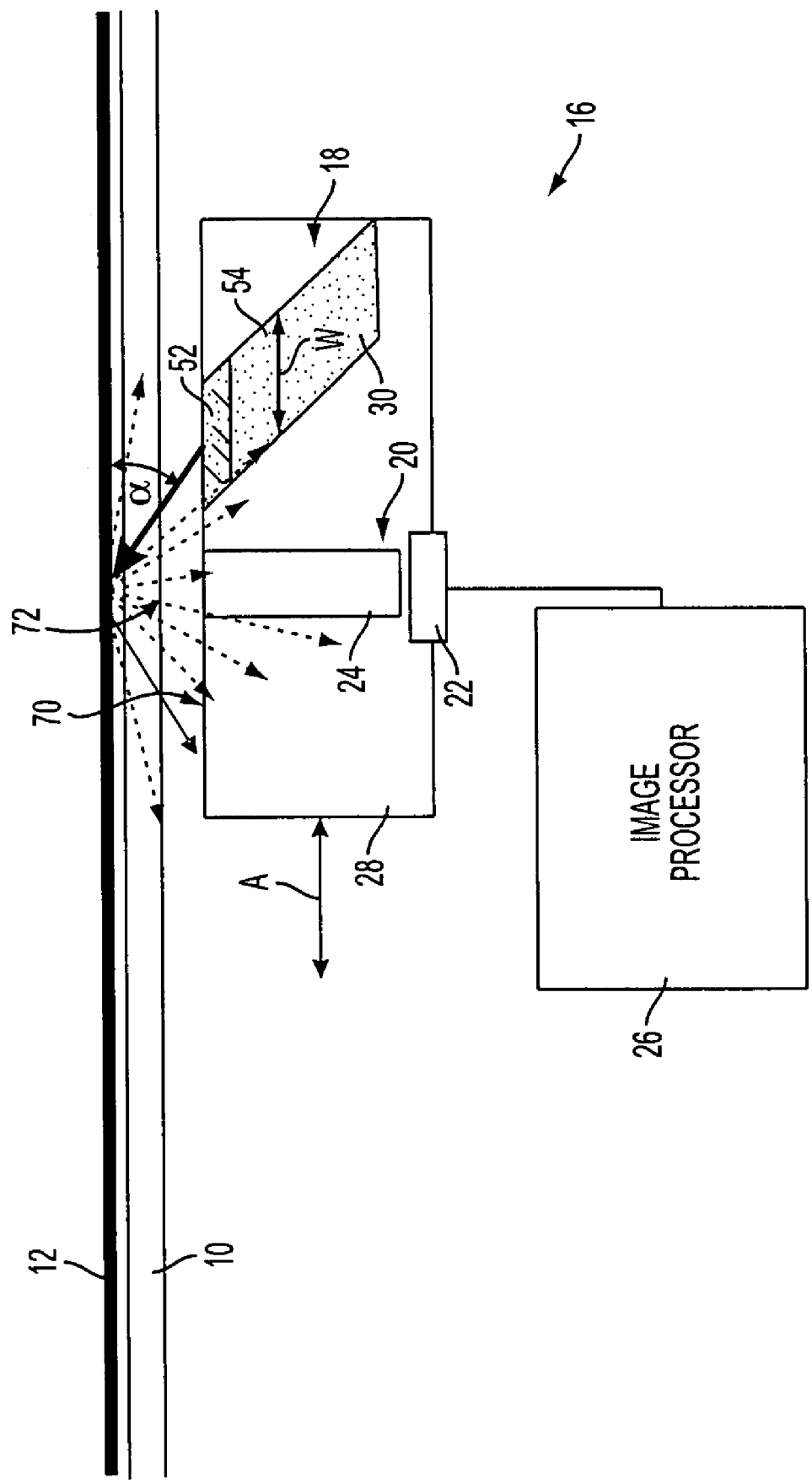
FIG. 1 is a simplified elevational view of a document scanner according to the exemplary embodiment.

With reference to FIG. 1, a document scanner in accordance with the exemplary embodiment includes a platen 10 on which a scan target, such as a document sheet 12, can be placed for recording therefrom. Optionally, associated with platen 10 is a document handler (not shown), which sequentially feeds sheets from a multi-page original document.

A scan bar 16 is positioned to illuminate the document and includes an illuminator 18 and a detector 20. The detector includes a photosensitive device 22 and a lens arrangement 24. The illuminator 18 illuminates a thin strip of the document while the photosensitive device 22, which includes one or more linear arrays of photosensors, records the reflected light. The photosensors may comprise solid state devices, such as CCD (charge coupled device) or CMOS (complementary metal oxide semiconductor) devices. The detector 20 includes a suitable processing device 26 for generating an image comprising signals representative of reflected light recorded by the photosensitive device. The lens arrangement 24, such as a SEFLOC® lens or other microlens arrangement with a predetermined acceptance angle, is interposed between the platen 10 and the photosensitive device 22 for focusing the reflected light on the photosensor array. The scan bar 16 can be mounted on a moveable carriage 28, for recording light reflected from images on sheets placed on the main portion of platen 10. In general, the carriage 28 translates in direction A, as shown in FIG. 1.

Figure 2:
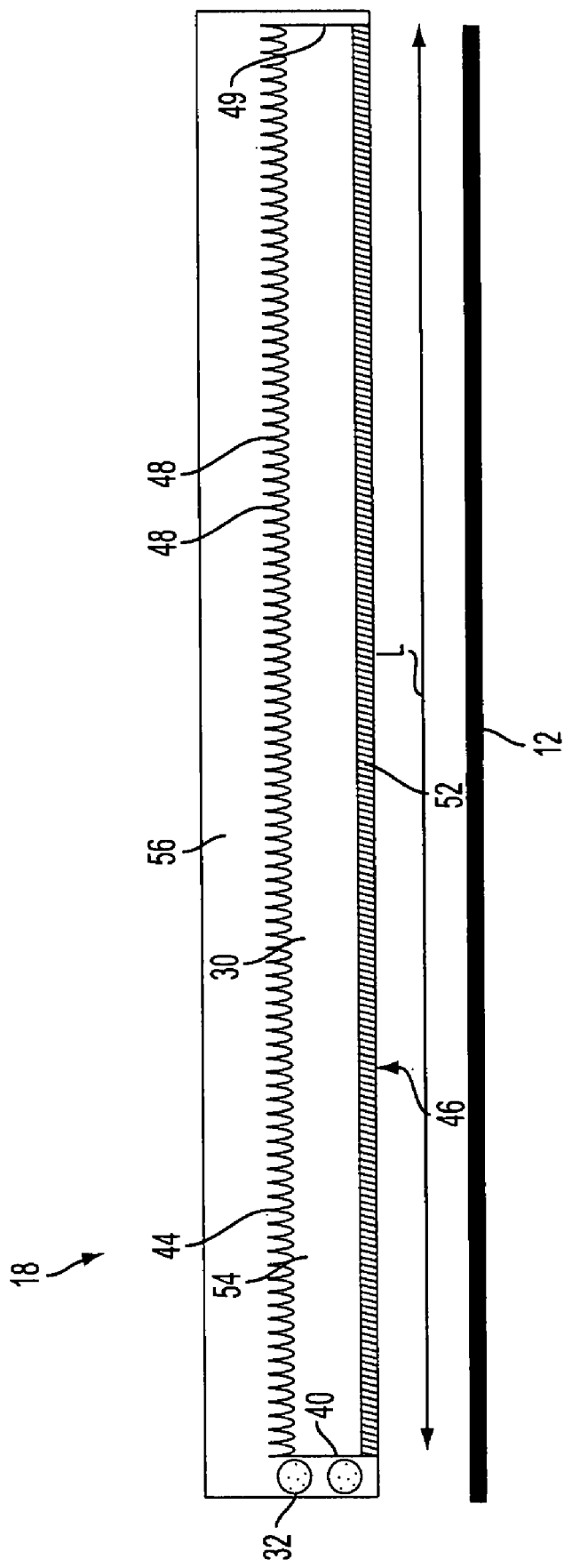
FIG. 2 is an enlarged schematic view of the illuminator of FIG. 1.

As best shown in FIG. 2, the illuminator 18 includes an optical element 30 in the form of a light pipe prism and at least one discrete light source 32 (two in the illustrated embodiment), such as one or more light emitting diodes or laser diodes (both of which will be referred to herein as LEDs). The light source 32 is positioned to direct light into the optical element 30. In an exemplary embodiment described herein, where more than one light source 32 is present, the light sources are actuated contemporaneously, although in other embodiments, it is contemplated that the LEDs may be actuated sequentially. Other discrete light sources are also contemplated, such as fiberoptic light guides. The optical element 30 can be made of any optical quality light-transmissive material, such as glass, quartz, polycarbonate, acrylic, or other plastic material.

The illustrated optical element 30 directs light from the light sources 32 onto the imaging area of the platen as a result of internal reflections within the prism. Light rays are illustrated schematically in FIGS. 1 and 2 to show the general directions in which the light travels. In one embodiment, the scanner includes two illuminators 18 which direct light to substantially the same small area of a document to be illuminated, but from different directions.

Figure 3:
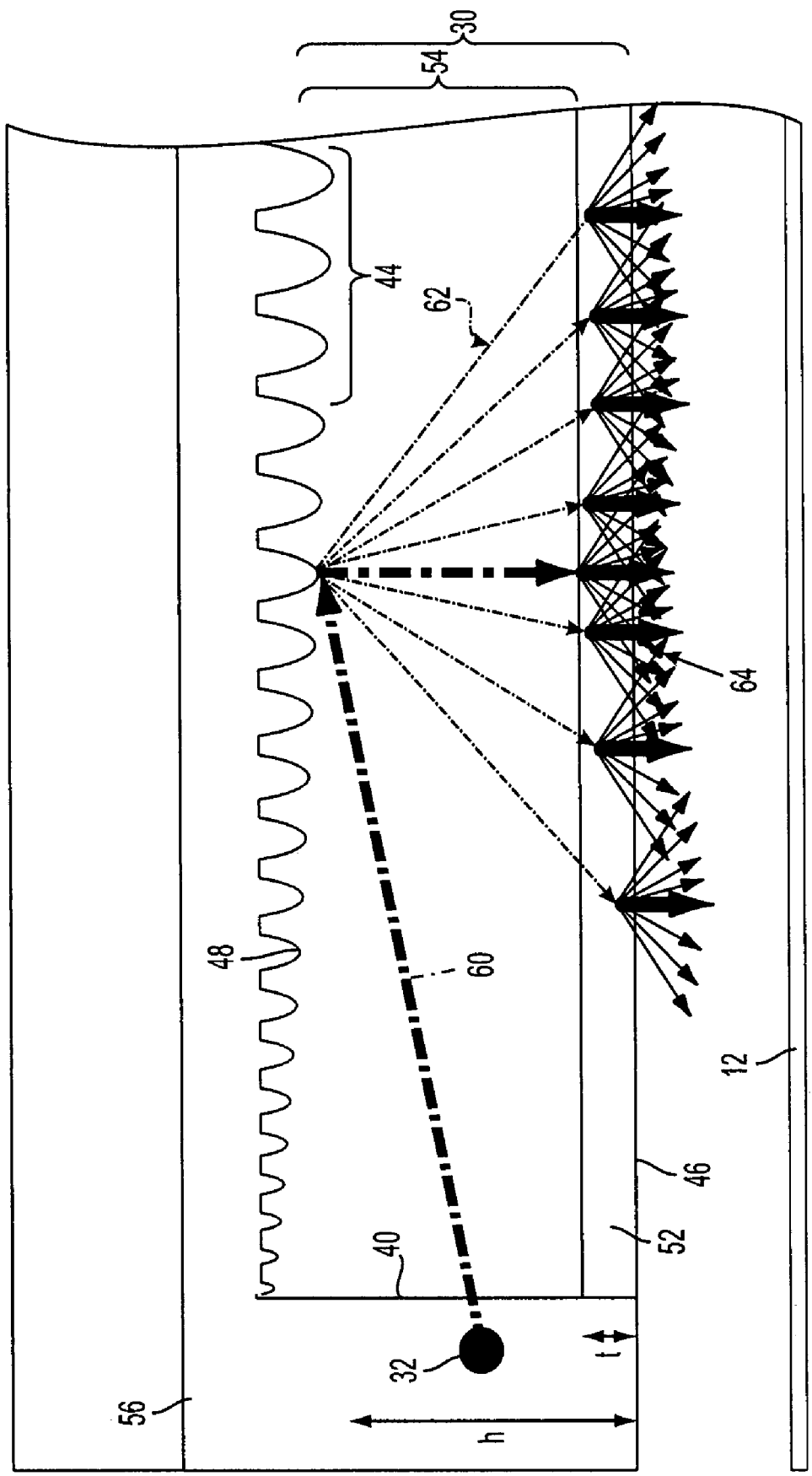
FIG. 3 is an enlarged schematic view of a portion of the illuminator of FIG. 2, illustrating directions of light rays in the prism.
Figure 4:
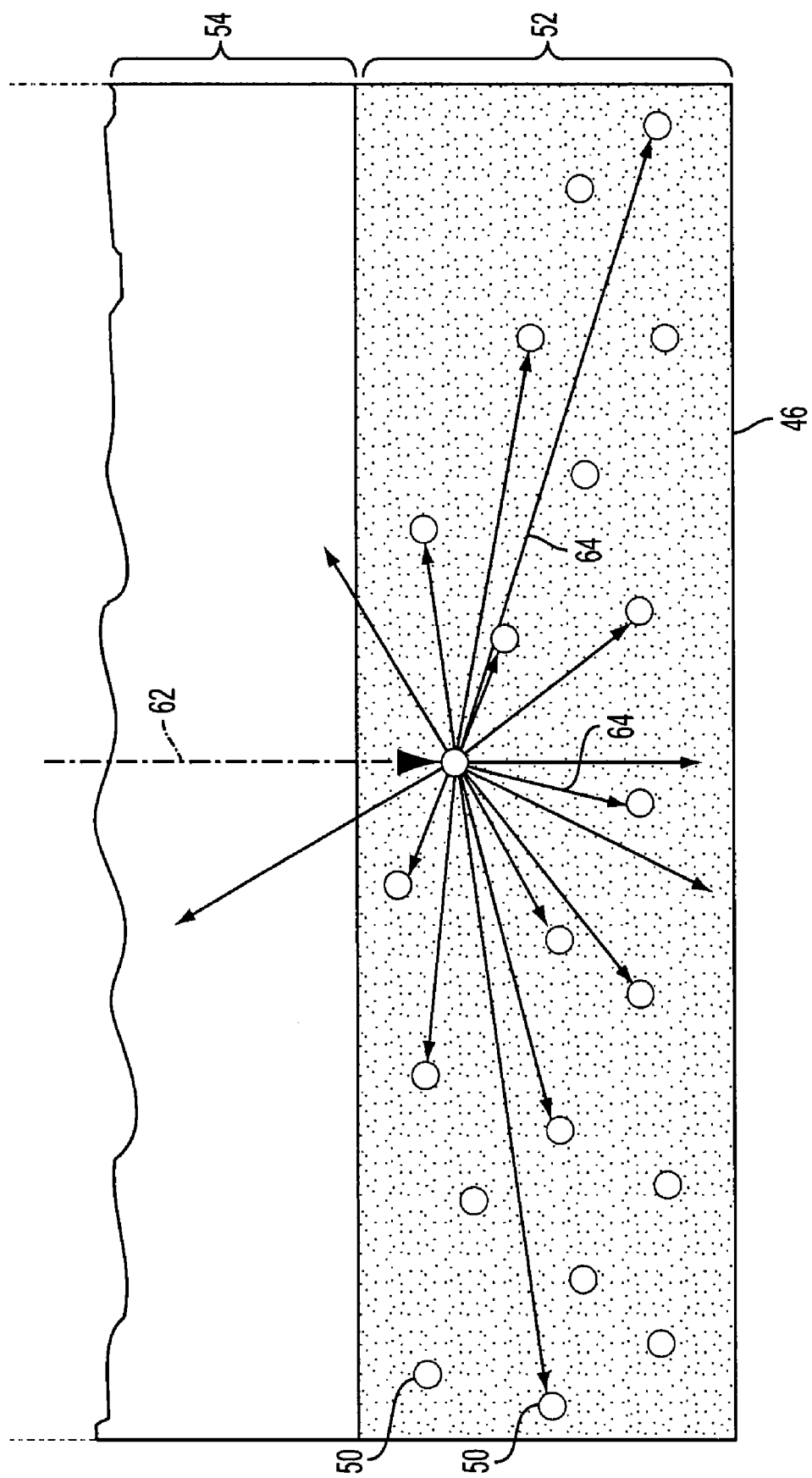
FIG. 4 is an enlarged schematic view of a portion of the illuminator of FIG. 3, illustrating directions of light rays sticking phosphor particles.

As shown in FIG. 2, the optical element 30 has its longest dimension L in the fast scan direction, i.e., perpendicular to the direction of travel of the scan bar 16. In the embodiment of FIGS. 2-4, all of the LEDs are disposed adjacent one end face 40 of the longest dimension of the optical element. If the small, point-like light sources 32 are in the form of small LEDs, each source 32 can be disposed within a dimple-shaped concavity in entry face 40. Alternatively the LEDs may be positioned elsewhere and illuminated with a right-angle reflector from the end. The optical element 30 includes a rear surface 44, which constitutes the surface furthest from the document 12, and a front or exit face 46, through which light is directed on to the document. The rear and front faces may be aligned generally in parallel with each other, as shown. In other embodiments, the front face may be angled to the rear face and/or curved, rather than planar.

A plurality of reflecting elements 48 is disposed along the rear surface 44. The illustrated reflecting elements 48 comprise projections which define notches therebetween, although it is also contemplated that other reflective elements may be provided, such as spaced reflective paint patches. The number of notches/paint patches in a scan bar 16 may be, for example, from about 20-500. Some of the light rays from the LEDs 32 travel down the length of the prism 30 and strike the notches 48 at the rear surface 44 of the prism. The notches act as a series of small mirrors which reflect the light toward the scan target 12. The light emitted by the LEDs 32 is thus reflected by the notches 48 toward the front surface 46 of the optical element. The projections/notches are illustrated as being smaller near the LEDs 32 and increasing in size toward an end face 49 of the prism 30 which is furthest from the LEDs. This assists in at least partially equalizing the distribution of light across the length L of the prism. In another embodiment, the notches may be of the same size and shape along the length L.

As shown in FIG. 1, the optical element 30 may be angled, relative to the document surface, such that the emitted light strikes the document at a mean angle α of between 0 and 90 degrees, e.g., at about 30-60 degrees. While in the illustrated embodiment the front face 46 lies in a plane which is generally parallel with that of the document surface, in alternative embodiments the front face 46 may be angled slightly to the light rays. The "tilt" in the face 46 may be between five and fifteen degrees, e.g., about ten degrees, from the plane of the document.

As shown in FIGS. 2-4, a phosphor material 50 is disposed intermediate to the LEDs 32 and the document 12. In one embodiment, the phosphor material is incorporated into a layer 52 which defines the front face 46 of the optical element. The layer 52 may be coextensive, along length L of the prism, with a base portion 54 of the optical element 30, which defines or supports the reflective elements 48. In general, the layer 52 and base portion 54 are rigidly attached to each other to form a unitary whole, for example by coating or overmolding base portion 54 with a phosphor-containing material for forming the layer 52, so that layer 52 serves as a cap for the preformed base portion 54. The layer 52 may be formed from the same optically transmissive material as the base portion 54, although it is also contemplated that different materials may be used.

As illustrated in FIG. 1, the cap 52 and base portion 54 may each have a cross sectional profile which is substantially the same (e.g., apart from the width of notches 48) along the length L of the optical element, or at least over the entire page width of the optical element.

Figure 5:
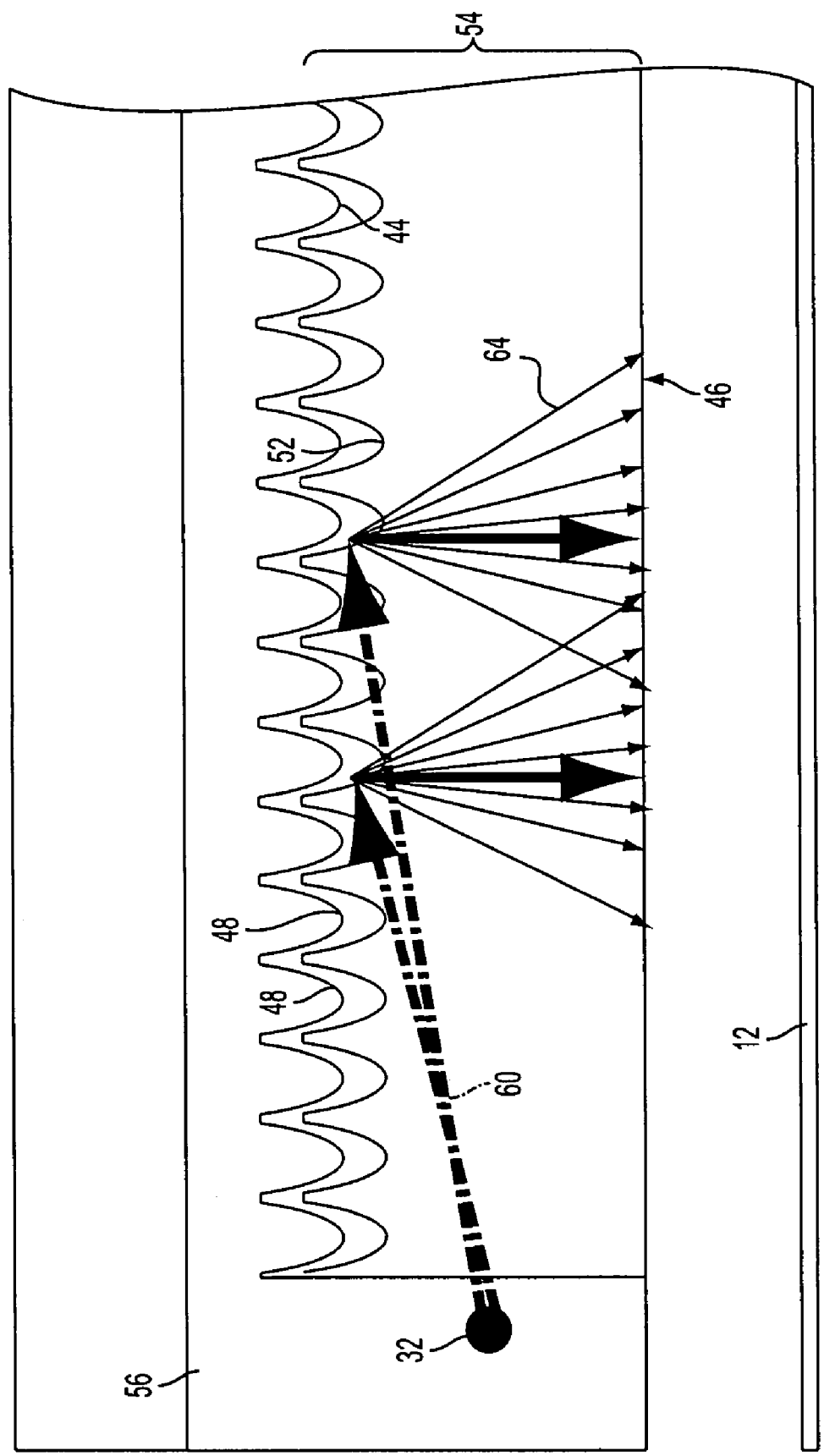
FIG. 5 is an enlarged schematic view of another embodiment of a portion of an illuminator suited to use in the document scanner of FIG. 1.

In the embodiments illustrated in FIGS. 3-5, the base portion 54 is located intermediate the light source(s) 32 and the phosphor containing layer 52 such that the light is predominantly reflected by the rear surface 44 before striking the phosphor material 50. The phosphor material 50 may be in the form of fine particles which are distributed relatively homogeneously throughout the layer 52 to intercept at least a portion of the light emitted from the LEDs. The phosphor material serves to diffuse the light impinging thereon, thereby reducing the non-uniformity of the light striking the document, as compared with a similar scan bar formed without the phosphor material.

The prism 30 may be at least partially enclosed in a cover 56 (e.g., the carriage). In the illustrated embodiment, the cover 56 surrounds all faces of the prism with the exception of the exit face 46. The cover 56 may be formed of an opaque material or material of a different refractive index than the prism, such that light is internally reflected within the prism.

FIG. 3 illustrates the scattering of the LED light rays 60 by the notches to produce rays 62, which travel in multiple directions, primarily toward the front face 46, and the further scattering of light rays 62 by the phosphor material to produce a more diffuse scattering of light illustrated by rays 64. FIG. 4 illustrates how the individual phosphor particles 50 contribute to the diffusion of the light. As will be appreciated, the phosphor particles can emit light in all directions, including toward the rear face 44. As shown in FIG. 1, this diffuse emission results in a larger portion of the light being reflected from document 12 as diffuse light (light reflected at all angles), illustrated by rays 70, and a smaller proportion of the light reflected as specular light (rays of light that are aligned parallel with the rod lens of the scan bar so that they bounce off the target and may tend to create a glare off of a shiny surface which may in turn obscure the image under this shiny surface), illustrated by ray 72.

The emissive properties of the phosphor particles 50 tend to provide a more uniform diffusion of light than can be achieved through modification of the surface texture of prism. In particular, the phosphor particles tend to energize their neighbors and this sharing of energy spreads light rays more broadly and more evenly because the light energy propagates through the phosphor with less loss of illumination than would be expected with surface textures which are more absorptive and lossy.

In one embodiment, the phosphor material 50 serves to convert at least a portion of the light emitted by the LEDs 32 to light of a different wavelength. For example, where the LEDs emit light of a relatively narrow wavelength, such as in the blue and/or UV range, the phosphor material may convert at least a portion of this light into light of other wavelengths such that the emitted light is relatively evenly distributed throughout the visible range. Such relatively evenly distributed light is often referred to as "white light." It is to be appreciated that "white light" encompasses a variety of shades, such as daylight, cool white, warm white, and the like in which the spectrum differs somewhat from a truly even distribution. All of these are considered to approximate white light. Other combinations of wavelengths may be selected for some applications, depending on the spectral makeup of the scanned target. All of this flexibility in the wavelength domain may be achieved from mixtures of different phosphors with their own light emission characteristics.

In a practical embodiment, the width w (FIG. 2) of front face 46 is in a range of about 10-15 mm; the height h (FIG. 4) between faces 44 and 46 may be about 10-20 mm, and the length L (FIG. 3) of the optical element 30 may approximate the width of the documents to be scanned, e.g., about 25-30 cm. The thickness t (FIG. 4) of phosphor layer 52 may be about 2 mm or less, e.g., at least 1 micron.

As is known in the art, the scanner may include memory for storing the scanned digital image. An image rendering device incorporating or linked to the scanner may include an image rendering component, such as a marking engine, which renders the stored image on a substrate, such as paper, using colorants such as inks or toners. A facsimile machine incorporating or linked to the scanner may include a processing component for outputting the stored digital image in a form which may transmit via a telephone line, cable link or other suitable wired or wireless link.

There are various ways of generating white light from an LED 32 with a phosphor or combination of phosphors which are suited to use in the exemplary embodiments disclosed herein. Where more than one phosphor is used as the phosphor material 50, the phosphors may be the form of a blend. Alternatively, the phosphors may be separately disposed in the form of layers which together make up layer 52.

In one embodiment, a single phosphor is used, such as a cerium doped yttrium aluminum garnet $Y_3Al_5O_2:Ce^{3+}$ ("YAG:Ce") or a cerium doped terbium aluminum garnet $Tb_3Al_5O_{12}:Ce^{3+}$ ("TAG:Ce"). Blue light, such as emitted from an InGaN LED, excites the phosphor, causing it to emit yellow light. The yellow light is combined with blue light emitted by the LED which approximates white light. In conventional phosphor notation, the component before the semicolon represents the host, while the component after represents the activator.

In another embodiment, the phosphor material comprises two phosphors. For example, a first phosphor converts UV/blue light from the LED to green light, while a second phosphor converts UV/blue light to red light. Such a system is disclosed, for example, in U.S. Pat. No. 6,252,254, incorporated herein in its entirety by reference. Suitable green emitting phosphors include $YBO_3:Ce^{3+},Tb^{3+}$; $BaMgAl_{10}O_{17}:Eu^{2+},Mn^{2+}$ in combination with at least one red-emitting phosphor, such as: $Y_2O_2S:Eu^{3+},Bi^{3+}$; $YVO_4:Eu^{3+},Bi^{3+}$; $SrS:Eu^{2+}$; $SrY_2S_4:Eu^{2+}$ and the like. The combined outputs approximate white light.

In other embodiments, a first phosphor converts the LED blue light to orange light, while the second converts blue light to yellow-green. The combined outputs approximate white light. Such a phosphor combination is disclosed, for example, in Pub. No. 20060231849, the disclosure of which is incorporated herein in its entirety, by reference. Another two phosphor system is disclosed in Pub. No. 20060113553, the disclosure of which is incorporated by reference in its entirety. In this system, the first phosphor may be an orange emitting $Eu^{2+}$, $Mn^{2+}$ doped strontium pyrophosphate $(Sr_{0.8}Eu_{0.1}Mn_{0.1})_2P_2O_7$ and the second phosphor may be a blue-green emitting $Eu^{2+}$ doped $(Sr_{0.90\text{-}0.99}Eu_{0.01\text{-}0.1})_4Al_{14}O_{25}$.

In another embodiment, the phosphor comprises three (or more) phosphors, such as at least one of each of a red, a green, and a blue inorganic phosphor. Any red, green, and blue inorganic phosphors can be used herein. The red phosphor may include at least one phosphor material selected from the group consisting of $(Sr,Ca,Ba,Mg)P_2O_7:Eu^{2+},Mn^{2+}$; $CaLa_2S_4:Ce^{3+}$; $SrY_2S_4:Eu^{2+}$; $(Ca,Sr)S:Eu^{2+}$; $SrS:Eu^{2+}$; $Y_2O_3:Eu^{3+},Bi^{3+}YVO_4:Eu^{3+}$, $Bi^{3+}$, $Y_2O_2S:Eu^{3+},Bi^{3+}$; $Y_2O_2S:Eu^{3+}$. The green phosphor may include at least one phosphor material selected from the group consisting of $YBO_3:Ce_3,Tb_3$; $BaMgAl_{10}O_{17}:Eu^{2+}$, $Mn^{2+}$; $(Sr,Ca,Ba)(Al,Ga)_2S_4:Eu^{2+}$; $ZnS:Cu,Al$; $Ca_8Mg(SiO_4)_4Cl_2:Eu^{2+}$, $Mn^{2+}$; $Ba_2SiO_4:Eu^{2+}$; $(Ba,Sr)_2SiO_4:Eu^{2+}$; $Ba_2(Mg,Zn)Si_2O_7:Eu^{2+}$; $(Ba,Sr)Al_2O_4:Eu^{2+}$; and $Sr_2Si_3O_8 \cdot 2SrCl_2:Eu^{2+}$. The blue phosphor may include at least one phosphor material selected from the group consisting of $(Sr,Mg,Ca)_{10}(PO_4)_6Cl_2:Eu^{2+}$; $BaMgAl_{10}O_{17}:Eu^{2+}$; and $BaMg_2Al_{16}O_{27}:Eu^{2+}$.

Other suitable phosphorescent powder formulas suitable for use as the phosphor material 50 for producing light which approximates white light are disclosed in U.S. Pat. Nos. 5,813,753, 6,252,254, 6,294,800, 6,621,211, 6,635,987, 6,685,852, 6,853,131, 6,809,471, 6,936,857, 7,038,370, 7,075,225, 7,112,921, 7,157,745, and 7,157,746, the disclosures of which are incorporated herein by reference in their entireties. Moreover, while in the exemplary embodiment, the output of the illuminator 18 is described in terms of approximating white light, it is to be appreciated that the light need not be white light but may be of any suitable wavelength range.

In one embodiment, the wavelength of the light from source 32 is in a range of from 360 nm to about 490 nm. The light source 32 may have an emission peak in the range of about 420-470 nm. A gallium nitride (GaN)-based light emitting device may be used as the light source device. Gallium indium (GaI) and gallium indium nitride (GaInN)-based LEDs and other LEDs are also contemplated.

In the case of a scan bar 16 suitable for monochrome (e.g., black and white) scanning, the illuminator 18 may employ a single LED or multiple LEDs 32 which all emit in a narrow wavelength band, e.g., in the blue and/or UV range of the spectrum, in combination with a phosphor material 50 which modifies at least a portion if the light from the LEDs to generate a broader spectrum of light which provides a good approximation of white light. In one aspect, all light sources in the illuminator are of the same type, e.g. UV/blue emitting, and thus emit in the same wavelength range to provide monochrome (e.g., blue) light. For example, all light sources in the illuminator emit light with a peak wavelength of less than about 470 nm. The phosphor material converts a portion of the emitted light to light of longer wavelength, such that the emitted light includes light in the wavelength range of 490-700 nm (the green to red regions of the electromagnetic spectrum) in addition to light in the blue range (400-490 nm).

Depending on the needs of the application, whether it be general purpose document scanning, currency scanning, or some other purpose, the emitted light color of the phosphor formulation or the emitted color of the LED may be selected to have a particular color hue that will create a desired level of contrast in the scanned image. For example, if the sensor 22 is more receptive to light of a particular wavelength, the illuminator 18 may be tailored to generate light which favors this wavelength.

In the case of a scan bar 16 suited for use in color scanning, a similar illuminator 18 may be used to that described for monochrome applications. The illuminator 18 may be used with image sensor elements that are filtered to restrict the color sensed by each pixel, in a similar manner to that which may be achieved with scan bars that use CCFL illuminators. For example, filters are sequentially applied to allow red, green, and blue light in turn to reach the sensor 22.

Alternatively, the illuminator 18 for color scanning may include three LEDs with peak wavelengths in three different regions, such as emitting the red, green, and blue regions of the electromagnetic spectrum, respectively. The three LEDs are sequentially actuated. Phosphor materials which are selectively responsive to the three wavelengths sequentially provide red green and blue emitted light.

An advantage of some aspects of the exemplary embodiment is an illuminator 18 which provides a more uniform illumination than is obtained with conventional CIS systems due to the phosphor layer 52 acting as a diffuser. Each particle 50 of phosphor can act as a point source of illumination which can collect the illumination from the LED 32 as distributed by the clear light-pipe prism 30, and then re-distribute that light substantially omni-directionally from a mass of point sources. This increases the uniformity of light across the scan bar 16 as well as reducing the effect of specular glare, particularly in the case of glossy documents.

The exemplary illuminator can thus emit similar illumination to a CCFL lamp, but only requires the electrical power for one LED 32. Additional LEDs or super bright. LEDs could also be used for brighter illumination. The exemplary illuminator 18 has attributes of the very even, well distributed and well diffused light that a CCFL lamp provides. Compared to a CCFL illuminator, however, the exemplary illuminator 18 can generally be fabricated at lower cost, is less fragile, and not as subject to breakage, requires much less power, and would only require the electrical drive requirements of the LED illumination source 32.

An exemplary fabrication method includes manufacturing a base portion 54 for the light-pipe prism 30 by injection molding from a clear acrylic or other suitable polymeric material. After the basic illuminator shape is molded, a front surface (facing the target document) is over-molded out of the same base material, to which a powdered white phosphor filler has been added to the clear plastic base material. The LED(s) 32 may be fitted into a dimple defined in the base portion 54 or mounted on a chip on top of the scan bar to shine light into the element 30. When energized by the light distributed through the clear portions 54 of the light-pipe prism, the front-surface layer 52 with white emitting phosphor filler 50 emits a very diffuse light that may principally be the color emitted by the phosphor formulation, but with some slight color from the color of the LED 32.

FIG. 5 illustrates another embodiment of an illuminator which may be similarly configured to the illuminator of FIGS. 1-4, except as noted. In this embodiment, the layer 52 comprising phosphor material 50 is disposed on the rearface 44 of the prism. The phosphor diffuses the light to an extent greater than which can be achieved by the notches 48 by themselves. In some embodiments, notches 48 may be omitted. In this embodiment, the rear face 44 may be roughened.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A scanning apparatus comprising:
    an illuminator for illuminating a portion of a document to be scanned, the illuminator comprising:
        at least one light source positoned to direct light into an optical element,
        the optical element positioned to redirect light emitted by the light source, and
        a phosphor material disposed intermediate the light source and the document to intercept at least a portion of the light redirected by the optical element; and
    a photosensitive device positioned to receive light reflected from the document for recording an image of the document.

2. The apparatus of claim 1, wherein the optical element includes the phosphor material.

3. The apparatus of claim 1, wherein the optical element includes a base portion formed of a light-transmissive material and a layer which includes the phosphor material.

4. The apparatus of claim 3, wherein the base portion includes at least one reflecting element for redirecting light from the light source toward the document.

5. The apparatus of claim 4, wherein the optical element includes opposed rear and exit faces, the light redirected by the optical element exiting through the exit face, and wherein the at least one reflecting element comprises a plurality of notches in the rear face of the optical element.

6. The apparatus of claim 4, wherein the at least one reflecting element comprises a plurality of reflective paint patches in a rear face of the optical element.

7. The apparatus of claim 3, wherein the base portion is intermediate the light source and the phosphor containing layer.

8. The apparatus of claim 1, further comprising a platen for supporting the document, the platen being disposed generally adjacent an exit face of the optical element.

9. The apparatus of claim 1, wherein the optical element and the at least one light source are supported on a movable carriage.

10. The apparatus of claim 1, wherein the phosphor material is disposed on a rear face of the optical element.

11. A scanning apparatus comprising:
    an illuminator for illuminating a portion of a document to be scanned, the illuminator comprising:
        at least one light source, the at least one light source comprising a light emitting diode,
        an optical element positioned to redirect light emitted by the light source, and
        a phosphor material disposed to intercept at least a portion of the light redirected by the optical element; and
    a photosensitive device positioned to receive light reflected from the document for recording an image of the document.

12. The apparatus of claim 11, wherein the phosphor material converts light from the light source to light of a different wavelength or a desired combination of wavelengths.

13. The apparatus of claim 12, wherein light emitted by the optical element, which includes the light converted by the phosphor material and unconverted light from the LED, approximates white light.

14. The apparatus of claim 1, wherein the optical element defines an entry face and an exit face, the exit face being substantially perpendicular to the entry face and wherein the light source is positioned adjacent the entry face and the phosphor material is disposed adjacent the exit face.

15. An illuminator comprising:
    an optical element in the form of a light pipe prism which defines an entry face and opposed rear and exit faces, the exit face being substantially perpendicular to the entry face, the rear face including a plurality of reflective elements for redirecting light received from the entry face toward the front face, a particulate material being disposed between the reflecting elements and the front face for diffusing light incident thereon; and
    at least one light source positioned adjacent the entry face.

16. The illuminator of claim 15, wherein the particulate material comprises at least one phosphor.

17. A scanning apparatus comprising the illuminator of claim 15 and a photosensitive device positioned to receive light reflected from a document for recording an image of the document.

18. The scanning apparatus of claim 17, wherein the scanning apparatus is a monochrome scanning apparatus.

19. The illuminator of claim 15, wherein the at least one light source comprises a light emitting diode.

20. A method for scanning a document comprising:
    with a scanning device, actuating a light source to emit light;
    transmitting the light through an optical element in the form of a prism which illuminates the document, the transmitting including transmitting the light through a layer of the optical element, the layer comprising a particulate material, the particulate material being disposed intermediate the light source and the document, the particulate material diffusing the transmitted light, thereby increasing uniformity of the illumination of the document.

21. The method of claim 20, wherein the transmitting further comprises:
    redirecting at least a portion of the emitted light toward the layer with a plurality of reflective elements.

22. The method of claim 20, wherein the transmitting further comprises:
    converting at least a portion of the light to light of longer wavelength with the phosphor material.

23. The scanning apparatus of claim 1, wherein the optical element is in the form of a prism.

* * * * *